United States Patent [19]

Rulis

[11] Patent Number: 4,989,886
[45] Date of Patent: Feb. 5, 1991

[54] BRAIDED FILAMENTARY SEALING ELEMENT

[75] Inventor: Raymond J. Rulis, Birmingham, Mich.

[73] Assignee: Textron Inc., Providence, R.I.

[21] Appl. No.: 321,370

[22] Filed: Mar. 9, 1989

Related U.S. Application Data

[63] Continuation-in-part of Ser. No. 292,482, Dec. 30, 1988.

[51] Int. Cl.$^5$ .................. F02F 11/00; F03D 11/00
[52] U.S. Cl. ........................ 277/230; 277/3; 277/27; 277/53; 277/160; 277/199; 415/173.3
[58] Field of Search ............ 277/96, 96.1, 96.2, 277/160, 199, 229, 230, 53, 81 R, 3, 27, 149; 415/173.3, 173.4, 174.2

[56] References Cited

U.S. PATENT DOCUMENTS

| | | | |
|---|---|---|---|
| Re. 30,206 | 2/1980 | Ferguson et al. | 415/174 |
| 885,032 | 4/1908 | DeFerranti | |
| 1,735,466 | 11/1929 | LeMay | 277/199 |
| 2,519,588 | 8/1950 | McCulloch | 415/173.4 X |
| 2,878,048 | 3/1959 | Peterson | 288/2 |
| 3,377,075 | 4/1968 | Feller | 277/160 X |
| 3,426,804 | 2/1969 | Black | 87/33 |
| 3,481,427 | 12/1969 | Dobbs et al. | 181/33 |
| 3,701,536 | 10/1972 | Matthews et al. | 277/56 |
| 3,702,220 | 11/1972 | Medawar et al. | 415/119 |
| 3,778,184 | 12/1983 | Wood | 415/174 |
| 3,825,364 | 7/1974 | Halila et al. | 415/116 |
| 3,890,060 | 6/1975 | Lipstein | 415/119 |
| 3,916,054 | 10/1975 | Long et al. | 277/96 X |
| 4,202,554 | 5/1980 | Snell | 277/53 |
| 4,257,735 | 3/1981 | Hurst | 415/173.3 X |
| 4,273,824 | 6/1981 | McComas et al. | 415/173.4 X |
| 4,274,575 | 6/1981 | Flower | 228/160 |
| 4,358,120 | 11/1982 | Moore | 277/192 |
| 4,415,309 | 11/1983 | Atterbury | 415/170 |
| 4,452,335 | 6/1984 | Mathews et al. | 181/214 |
| 4,526,509 | 7/1985 | Gay, Jr. et al. | 415/174 |
| 4,531,362 | 7/1985 | Barry et al. | 60/226.1 |
| 4,534,571 | 8/1985 | Tittes et al. | 277/151 X |
| 4,536,127 | 8/1985 | Rossmann et al. | 415/174 |
| 4,600,202 | 7/1986 | Schaeffler et al. | 277/53 |
| 4,678,113 | 7/1987 | Bridges et al. | 228/160 |
| 4,704,332 | 11/1987 | Brennan et al. | 428/428 |
| 4,756,536 | 7/1988 | Belcher | 277/53 |

FOREIGN PATENT DOCUMENTS

| | | | |
|---|---|---|---|
| 2344666 | 3/1974 | Fed. Rep. of Germany | 277/53 |
| 1275901 | 6/1972 | United Kingdom | 277/96.1 |

Primary Examiner—William A. Cuchlinski, Jr.
Assistant Examiner—Scott Cummings
Attorney, Agent, or Firm—Reising, Ethington, Barnard, Perry & Milton

[57] ABSTRACT

A braided filamentary sealing element is provided for use between components in a gas turbine engine or other machine where a clearance space is provided between the components. The sealing element is adapted to be carried on one component. The sealing element includes an integral three dimensionally braided filamentary sealing surface to effect a fluid sealing action between the components. The sealing element may also include a plurality of three dimensionally braided flexible filaments having a free length sufficient to engage the other of the components to effect a fluid sealing action between the components.

26 Claims, 5 Drawing Sheets

BRAIDED FILAMENTARY SEALING ELEMENT

This is a continuation-in-part of U.S. patent application Ser. No. 292,482 filed Dec. 30, 1988.

FIELD OF THE INVENTION

The invention relates to seals and, more particularly, to flexible braided filamentary seals for use between spaced components of a machine.

BACKGROUND OF THE INVENTION

With seals between relatively moving machine components, the danger exists that the components may approach one another to a point where severe friction between the components may cause excessive heating and possible destruction of the seal. This is a particular problem in gas turbine engines which have many high speed components rotating relative to stationary components carrying sealing elements thereon.

In one attempt to address this problem, an abradable coating has been provided on the stationary component or rotating component. The coating is gradually worn away by contact with the other component and, as a result, the clearance between the components is increased and sealing efficiency is reduced.

In another attempt to solve this problem, a so-called brush seal is carried on one of the machine components and includes tightly packed bristles to engage the other adjacent component rotatable relative thereto to effect fluid sealing between the components. U.S. Pat. Nos. 885,032; 2,878,048; 4,202,554; 4,358,120; and U.S. Pat. No. Reissue 30,206 illustrate such brush seals. Various fabrication techniques have been employed to make such brush seals. Many of these fabrication techniques are slow, costly and labor intensive. U.S. Pat. No. 4,415,309 illustrates a technique for fabricating a brush seal for a gas turbine engine wherein the sealing element is formed as a woven fabric having metallic warp filaments, metallic weft filaments and metallic warp pile filaments. A portion of the fabric formed of the warp and weft filaments is brazed to one component of the gas turbine engine. The warp pile filaments are cut to form a brush seal for engaging the other component of the gas turbine engine.

SUMMARY OF THE INVENTION

The invention contemplates a sealing element for use in a machine, including but not limited to a gas turbine engine, having adjacent components separated by a clearance space. The sealing element is carried on one of the components and includes a sealing portion disposed in the clearance space in juxtaposition to the other component. The sealing portion comprises a plurality of three dimensionally braided filaments. The sealing portion may include an integral braided sealing surface for effecting a sealing action with the other component. Alternatively, the sealing portion comprises three dimensionally braided filaments having a free length in a direction toward the other component sufficient for engaging that component to effect a sealing action between the components. The three dimensionally braided sealing portion exhibits size/shape restorative capabilities and compliancy/resiliency to accommodate thermal and/or dynamic displacements of the components relative to one another to maintain the desired sealing action under service conditions as well as to eliminate the need to preload the sealing element.

In one embodiment of the invention, means may be provided for biasing or preloading the sealing element toward the other component. Such biasing means may include spring means between the sealing element and the component on which it is carried. The biasing means may also include fluid pressure means for exerting fluid pressure on the sealing element.

In another embodiment of the invention, means is provided for preloading or biasing the filaments at an angle generally in the direction of rotation of one of the machine components to insure positive contact with the component and to accommodate expected wear of the filaments. To this end, a spring member can be disposed exteriorly or interiorly of the sealing element to effect the desired preload of the braided filaments in the desired direction. In the latter situation (i.e., an internal spring member), the flexible filaments can be braided about stuffer, filaments which are oriented in the braided pattern to bias or preload the braided filaments in the desired direction.

In still another embodiment of the invention, the braided filaments can be braided in a manner to form a cooling passage in the sealing element or in a manner to have a lesser braid density in one location than another to permit preferential flow of cooling fluid about the less densely braided filaments. In this way, the sealing element can be internally cooled to reduce its temperature or to allow its use in higher temperature applications.

The sealing element may comprise a plurality of arcuate segments abutted together at joints to form an annular seal between annular first and second fluid machine components. At the joints, the segments may circumferentially overlap to provide fluid sealing at the joints.

DETAILED DESCRIPTION OF THE INVENTION

Figure 1:
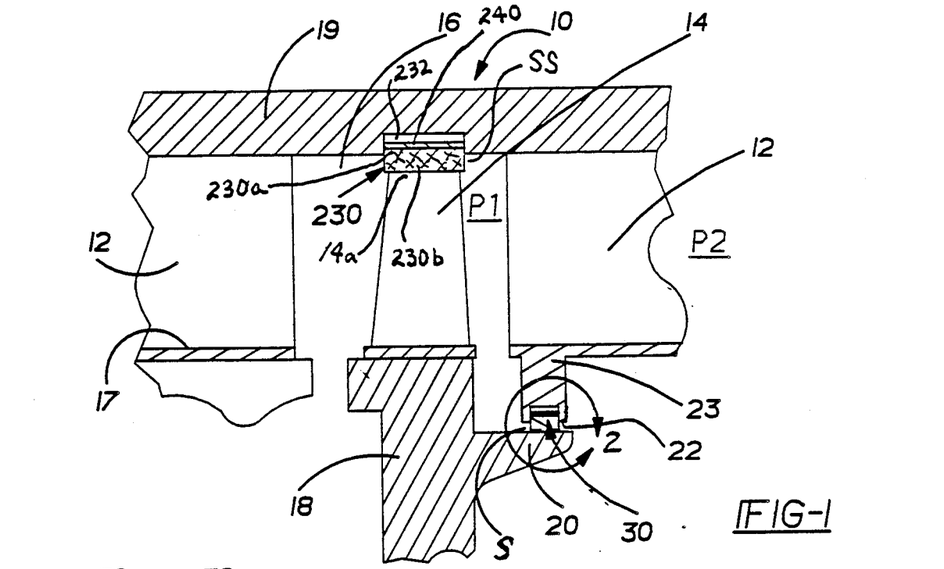
FIG. 1 is a sectioned side view of part of the compressor or turbine of a gas turbine engine having a sealing element in accordance with the invention.

With reference to FIG. 1, a portion of the compressor 10 of an axial flow gas turbine engine is shown provided with alternate annular arrays of stator and rotor airfoil blades 12,14 which are positioned in an annular gas passage or duct 16 of the engine. The stator blades 12, portions of two of which can be seen in FIG. 1, span the passage 16 between its inner and outer duct walls 17,19. The rotor blades 14, one of which is shown in FIG. 1, are mounted on rotor (rotary) discs 18, a portion of one of which is shown. As is well known, the rotor discs are driven by the turbine section (not shown) of the engine through a shaft (not shown).

The rotor disc 18, on which the rotor blade 14 and a plurality of similar blades (not shown in FIG. 1) are mounted, is provided with an axially extending, annular rotor flange 20. The annular rotor flange 20 cooperates with annular stator portion or surface 22 on an annular stator appendage 23 to define a clearance space S. The clearance space S is sealed by an annular sealing element 30 in accordance with the invention.

Figure 2:
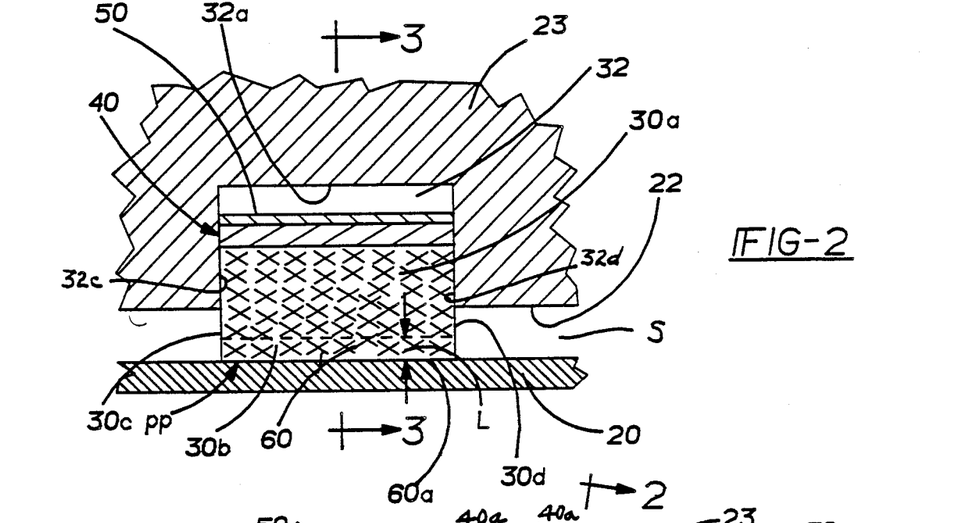
FIG. 2 is an enlarged sectioned side view of the encircled portion of FIG. 1 illustrating one embodiment of the invention.
Figure 3:
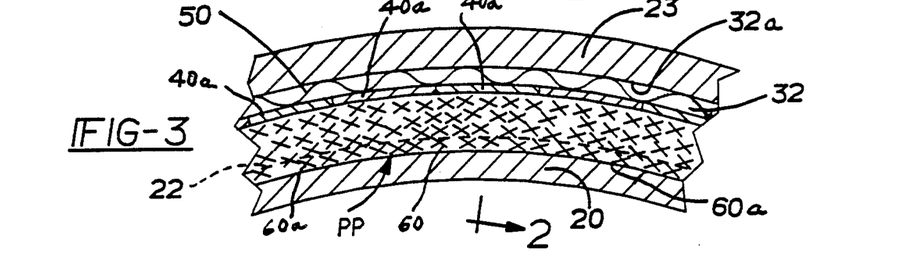
FIG. 3 is a partial sectioned front view of the sealing element of the invention along lines 3—3 of FIG. 2.

One embodiment of the invention is illustrated in FIGS. 2-3. The stator surface 20 is shown including an annular recess 32 for receiving an outer portion 30a of the sealing element 30. The sealing element 30 includes an optional support plate 40 having a plurality of arcuate segments 40a abutted circumferentially around the sealing element 30. The support plate 40 is optional and may be eliminated depending upon the structural integrity of the sealing element 30. The support plate 40 may be attached to the sealing element 30 by brazing, welding, gluing or mechanically by crimping or swaging as well as other techniques.

Positioned between the support plate 40 and the outer wall 32a of the recess 32 is an optional circumferentially extending biasing or preload serpentine-shaped spring 50 which can be selected to exert a predetermined bias on the sealing element 30 toward the rotor flange 20. Those skilled in the art will appreciate that other types of springs may be used for this purpose but that use of a preload spring in the invention is optional.

The sealing element 30 comprises a filamentary structure fabricated in accordance with conventional braiding procedures have a plurality of filaments 60 densely braided in a three dimensional braided pattern; e.g., as illustrated in the Bluck U.S. Pat. No. 3,426,804 and copending U.S. application Ser. Nos. 191,434 (now U.S. Pat. No. 4,922,798) and 191,564 of common assignee herewith, the teachings of which patent are incorporated herein by reference.

As shown in FIGS. 2-3, the 3-D braided sealing element 30 includes the outer portion 30a received in the support plate 40 and the inner sealing portion 30b disposed in the clearance space S in juxtaposition to the annular rotor flange 20. The inner sealing portion 30b includes a plurality of the densely braided filaments 60 having a degree of flexibility/compliancy and having a free length L toward the annular flange 20 (i.e., a radial length with free ends 60a) which is sufficient relative to annular rotor flange 20 to effect a positive sealing action (contact) with the rotor flange 20. The braided sealing element 30 is severed (e.g., cut) at a proper plane PP to impart a desired free flexible length L to the filaments 60 relative to the support plate 40; i.e., the severed filaments 60 have severed free ends 60a at arcuate plane PP. Moreover, the density (or porosity) of the braided filaments is controlled to achieve a desired gas sealing action in the clearance space S.

The preload applied on the sealing element 30 by the preload spring 50 insures continued sealing contact of the filaments 60 with the rotor flange 20, thus accommodating any wear of the filaments 60 in service.

The sealing element 30 also includes front and rear side portions 30c,30d adapted to sealingly engage the respective front and rear walls 32c,32d of the recess 32a.

The filaments 60 from which the sealing element 30 is braided may comprise metallic and non-metallic (e.g., SiC, graphite, ceramic, etc.) filaments as well as mixtures of metallic and non-metallic filaments. The filaments 60 may comprise fibers, fiber bundles, yarns, etc. as desired to produce suitable seal properties for particular temperature and pressure conditions in the passage 16; such as, for example, suitable mechanical properties in three axes, wear resistance, porosity, thermal conductivity, oxidation and heat corrosion resistance, and hoop strength at expected centrifugal stress levels in the event the seal is carried on a rotating component such as rotor flange 20 instead of a stator component. The braided sealing element 30 may be infiltrated to various extents with a matrix material, such as metal, non-metallics such as plastic, ceramic and the like to this same end.

The sealing element 30 is advantageous in applications where thermal and/or dynamic displacements can occur between the components during service or use; e.g., where there is movement of the rotor flange 20 and the stator appendage 23 relative to one another during operation of the gas turbine engine. In particular, the sealing element 30 exhibits size/shape restorative capabilities as well as compliancy/resiliency to accommodate such relative displacement of the rotor flange 20 and the stator appendage 23 toward one another and maintain a sealing action between these components before and after such relative displacement therebetween. Such size/shape restorative capabilities of the sealing element 30 is highly advantageous as the need for preloading the sealing element 30 in use is thereby eliminated. As mentioned hereinabove, use of the preload spring 50 is optional. The braided pattern of the filaments 60 itself imparts a degree of restorative capability to the sealing element 30 by virtue of the filaments 60 interacting with one another to return to or maintain the braided pattern in which they are formed. Moreover, the sealing element 30 will exhibit a degree of compliancy and resiliency to accommodate the relative displacements between the components without being permanently deformed or distorted and to return to the original braided size/shape when the relative displacement is reduced or terminates. The type of braided pattern, the tightness of the braided pattern of filaments and the physical properties (resiliency, yield strength and size) of the filaments 60 can be selected to these ends.

Figure 4:
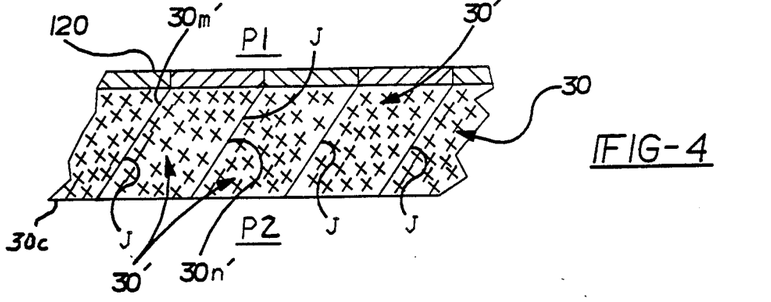
FIG. 4 is a sectioned top view of the sealing element formed of arcuate segments abutted together.

Referring to FIG. 4, the sealing element 30 of FIGS. 1-3 is shown formed of a plurality of arcuate segments 30' that are abutted at joints J formed by complementary chamfered sides 30m',30n' on the segments 30'. The sides 30m',30n' are configured to provide circumferential overlapping of the adjacent segments 30' at each joint J for fluid sealing purposes. An optional segmented back-up plate 120 (i.e., formed of arcuate segments) may be disposed on the low pressure side of the sealing element 30 to further enhance the fluid sealing action.

Figure 5:
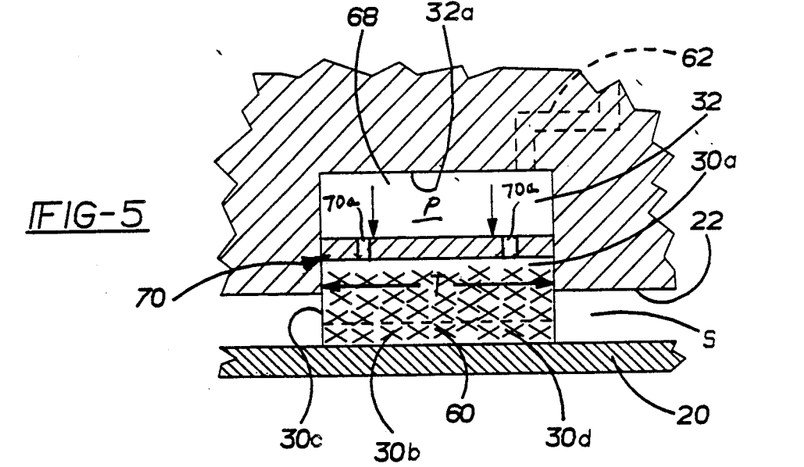
FIG. 5 is similar to FIG. 2 illustrating another embodiment of the invention.

Referring to FIG. 5, another embodiment of the invention is illustrated wherein the sealing element 30 described hereinabove is biased or preloaded toward the annular rotor flange 20 by fluid pressure P applied in the chamber 68 formed between the outer wall 32a of the recess 32 and a fluid metering piston plate 70 attached to the outer portion 30a of the sealing element 30. The piston plate 70 is optional and, if used, includes a plurality of metering apertures 70a for controlling the amount of fluid pressure preload exerted on the sealing element 30. As shown in FIGS. 1–5, the fluid pressure P may be taken from the high pressure P2 in passage 16 downstream of the sealing element 30. For example, in the compressor section, the pressure P2 in the passage 16 downstream of the sealing element 30 will be higher than the pressure P1 in the passage 16 upstream of the sealing element 30. One or more passages 62 may be provided in the stator appendage 23 to pipe the high fluid pressure P2 to the chamber 68.

As mentioned, use of the piston plate 70 is optional and it may be omitted in some situations. When the piston plate 70 is omitted, the density of the braided filamentary sealing element 30 is selected to control the desired fluid pressure preload thereon. An advantage of using the braided sealing element 30 is that its density can be controlled by controlling the tightness of the braid, the size of the filaments 60, and degree of infiltration of the sealing element with a matrix material if any is used. In particular, the density of the braided sealing element 30 can be varied across its radial dimension to provide, for example, a density that is higher adjacent the chamber 68 and decreases toward a lesser density at the sealing portion 30b.

Figure 6:
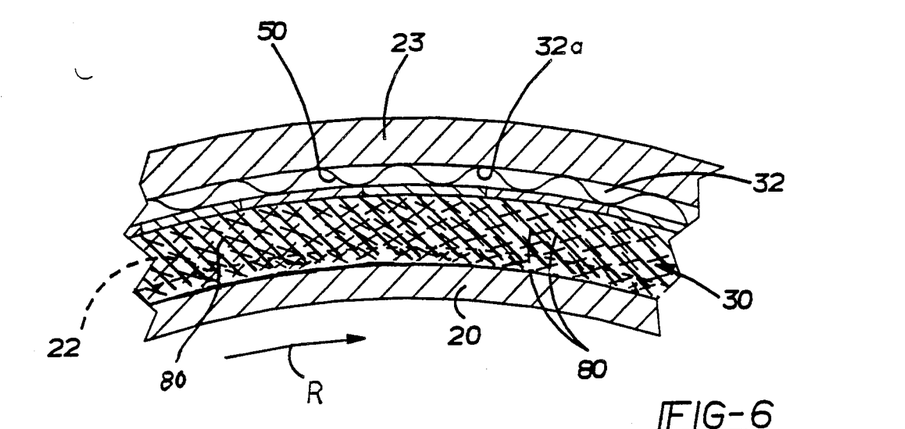
FIG. 6 is a partial sectioned front view similar to FIG. 3 showing another embodiment of the invention.
Figure 7:
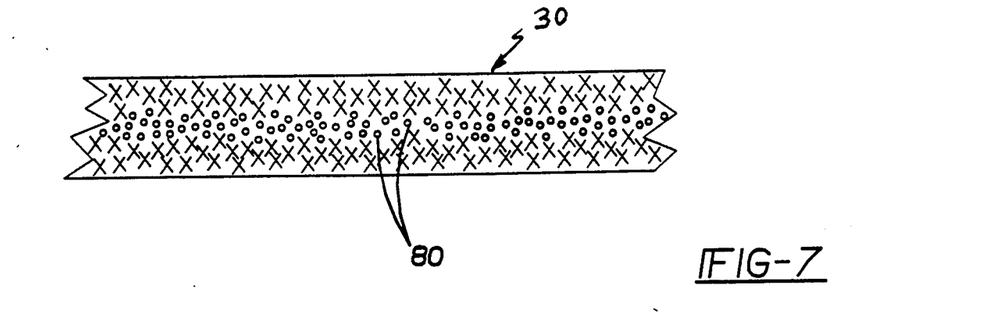
FIG. 7 is a partial sectioned top view of the sealing element of FIG. 6.

In a preferred embodiment of the invention, the sealing element 30 is preloaded or biased at an angle generally in the direction of rotation of the rotor disc 18 to insure positive contact with the annular rotor flange 20 and to accommodate expected wear of the filaments 60. For example, referring to FIGS. 6–7, the 3-D braided sealing element 30 can include a plurality of stuffer filaments 80 incorporated therein during the braiding process (i.e., the filaments 60 are braided about the stuffer filaments 80) and oriented in such a manner as to bias the sealing element 30 at an angle generally in the direction of rotation R of the rotor disc 18. The stuffer filaments 80 are selected to have physical properties (e.g., stiffness) to maintain the desired preload or bias of the braided filaments 60 relative to the rotor flange 20 and yet undergo elastic deflection, if necessary, to accommodate changes in preload resulting from thermal and/or dynamic displacement of the rotor flange 20 and the stator appendage 23 relative to one another. The size, number, orientation and material of the stuffer filaments 80 is selected to this end. The bias of the sealing element 30 in a particular direction can thus can be achieved by the braiding process employed to fabricate the sealing element. This is advantageous as the need for separate assembly and fastening steps as well as separate biasing members is eliminated. The aforementioned copending application Ser. No. 191,564 describes apparatus for braiding filaments 60 about stuffer filaments 80.

Figure 8:
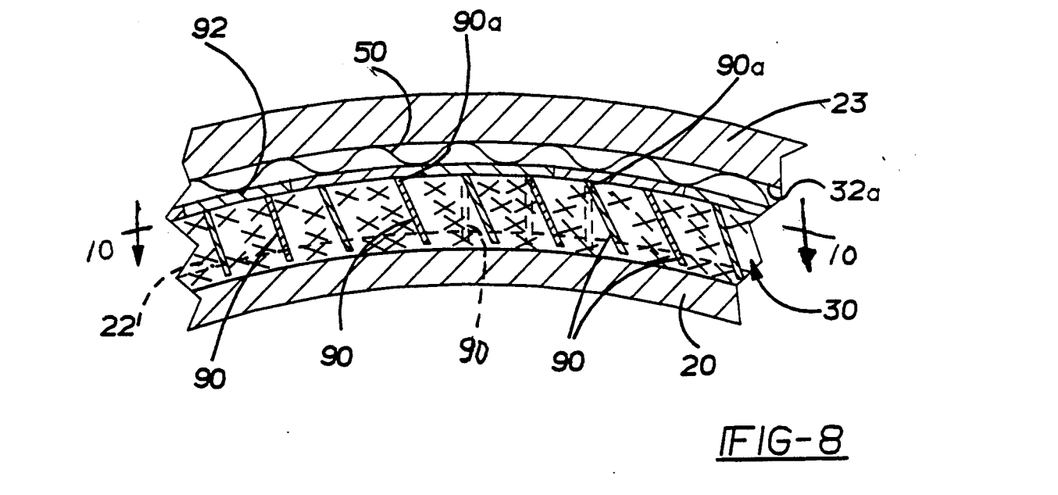
FIGS. 8 and 9 are partial sectioned front views similar to FIG. 3 of other embodiments of the invention.
Figure 10:
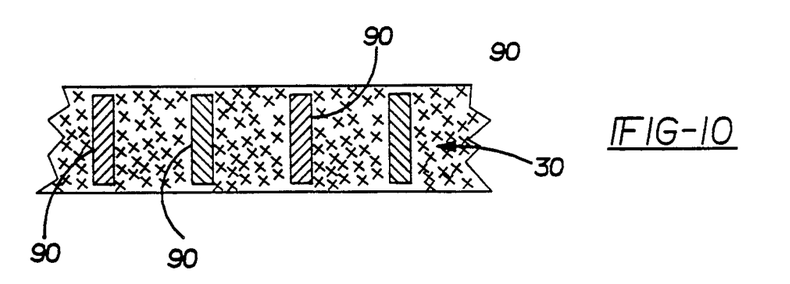
FIG. 10 is a partial sectioned top view along lines 10—10 of FIG. 8.

An alternative embodiment for preloading the sealing element 30 in the direction of rotation of the rotor disc 18 is illustrated in FIGS. 8 and 10. In FIGS. 8 and 10, a plurality of circumferentially spaced apart preload spring plates 90 are disposed in the 3-D braided sealing element 30. Each spring plate 90 includes an end 90a attached to an arcuately segmented back-up plate 92. Advantageously, each spring plate 90 can be received in a pocket formed in the sealing element during the braiding operation. The spring plates 90 are initially received in the sealing element in a non-canted orientation (e.g., see phantom lines) and are subsequently canted (e.g., deformed by suitable means) to the position shown in solid lines in such a manner as to bias the spring element 30 in the desired direction.

Figure 9:
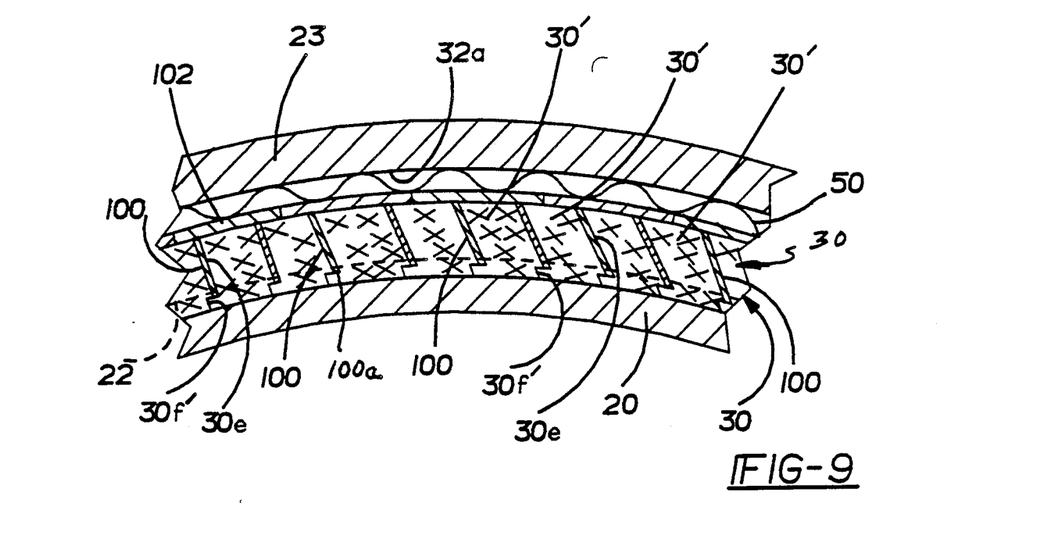

FIG. 9 illustrates still another embodiment of the invention where a plurality of circumferentially spaced apart external spring plates 100 are attached to an arcuately segmented back-up plate 102 for engaging a radial side 30e of each segment 30' of the sealing element 30 in such a manner as to bias each segment 30' at an angle in the direction of rotation of rotor disc 18. As is apparent, each spring plate 100 engages a respective segment 30' of the sealing element 30 from the exterior thereof. In this embodiment, the arcuate segments 30' include circumferentially extending lands 30f that nest with the adjacent segment 30' to seal off the clearance space beneath the inner ends 100a of each spring plate 100. Spring plates 100 are canted (e.g., deformed after assembly with segments 30') in the appropriate direction to bias the segments 30' in the direction of rotation of the rotor disc 18.

Figures 11, 12, 13:
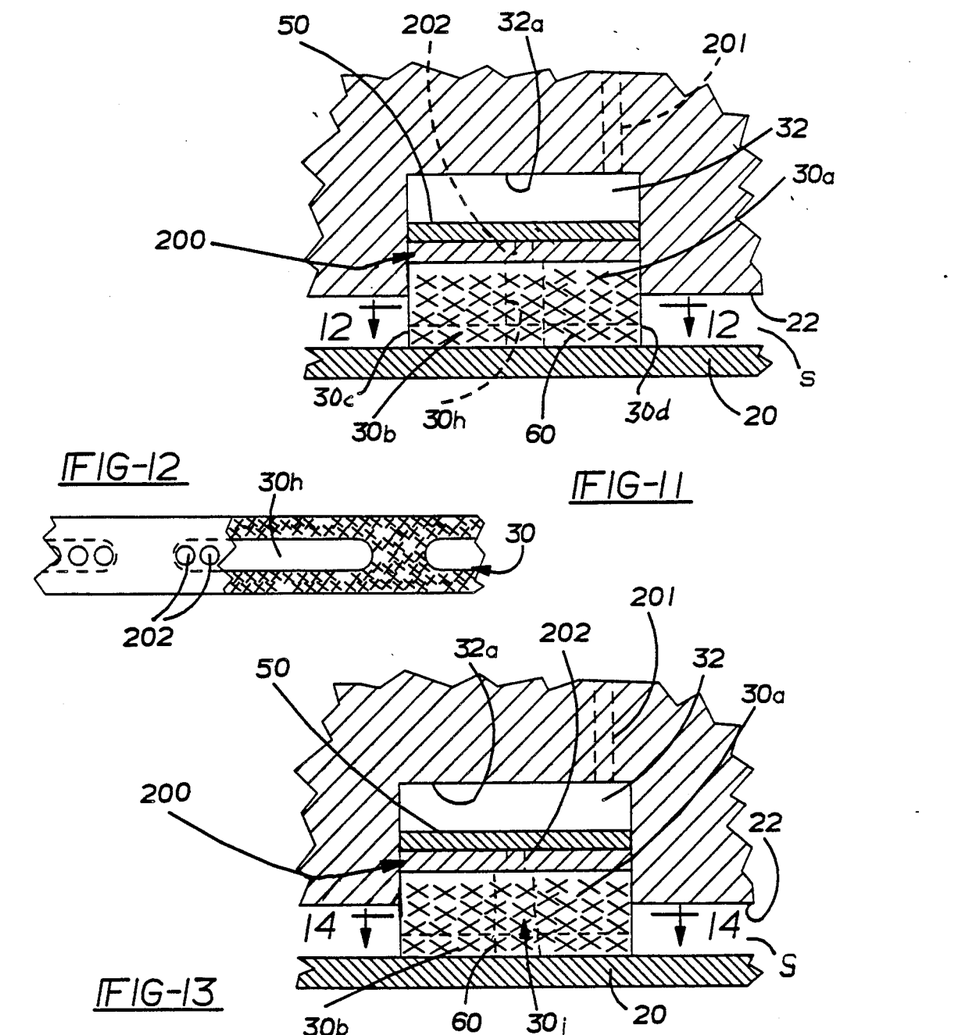
FIG. 11 is a sectioned side view similar to FIG. 2 illustrating another embodiment of the invention.
FIG. 12 is a partial sectioned top view of the sealing element along lines 12—12 of FIG. 10.
FIG. 13 is a sectioned side view similar to FIG. 2 illustrating another embodiment of the invention.

In some applications, it may be desired to cool the sealing element 30 in service; e.g., when the sealing element is subjected to high service temperatures in the compressor section or turbine section of the gas turbine engine. FIGS. 11–12 illustrate a segment of a sealing element 30 having an internal longitudinal cooling passage 30h through which cooling fluid, such as low temperature air, is passed to reduce the temperature of the sealing element. The air flow is supplied through a passage 201 in the stator appendage 23 into one or more apertures 202 in an arcuately segmented back-up plate 200 that is attached to the sealing element. The cooling passage 30h may be formed in the 3-D braided sealing element by braiding the filaments 60 about a mandrel or core (not shown) and then removing the mandrel after the braiding operation.

The passage 201 may alternatively be used as a vent passage to "vent off" high pressure air from the sealing element and thereby permit a greater pressure differential to be accommodated across the sealing element 30; i.e., between the front and rear side portions 30c,30d of the sealing element.

Figure 14:
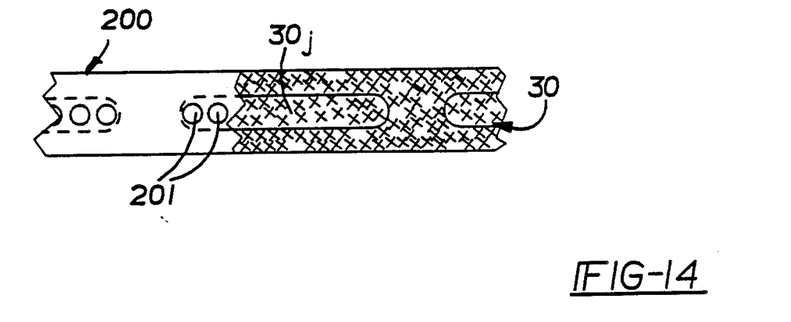
FIG. 14 is a sectioned top view along lines 14—14 of FIG. 13.

FIGS. 13–14 illustrate another embodiment similar to FIGS. 11–12 but substituting a less densely braided central core 30j for the cooling passage 30h. The braided core 30j is provided with increased porosity (lower density) than surrounding densely braided portions of the sealing element, the increased porosity being sufficient to permit air flow along the core 30j through passage 201 into one or more apertures 202 in the arcuately segmented back-up plate 200. The sealing element can be braided with such differential density by varying the filament braiding pattern, the size of the filaments in the core 30j relative to those surrounding the core 30j and/or by removing filaments from the core 30j after the braiding operation.

Referring to FIG. 1, another sealing element 230 of the invention can also be used to provide a so-called tip seal for sealing the clearance space SS between the tips 14a of the rotor blades 14 (only one shown) and the outer duct wall 19 of the gas turbine engine. In this application, the inner sealing portion 230b of the sealing element is contacted by the tips 14a of the blades 14 as they rotate relative thereto. The outer portion 230a of the sealing element 230 may be attached to a support plate 240 received in a recess 232 in the outer duct wall 19 in the same manner as in the embodiments described hereinabove for the embodiments of FIGS. 2-14. A similar tip seal may be used to seal the tips of blades in the turbine section of the gas turbine engine.

Instead of the sealing element 230 being carried on the outer duct wall 19, the invention envisions alternatively attaching an individual sealing element 230 to the tip 14a of each blade 14. In this case, the sealing element on each blade tip 14a would sealingly engage the outer duct wall 19 as the rotor disc 18 rotates.

Figure 15:
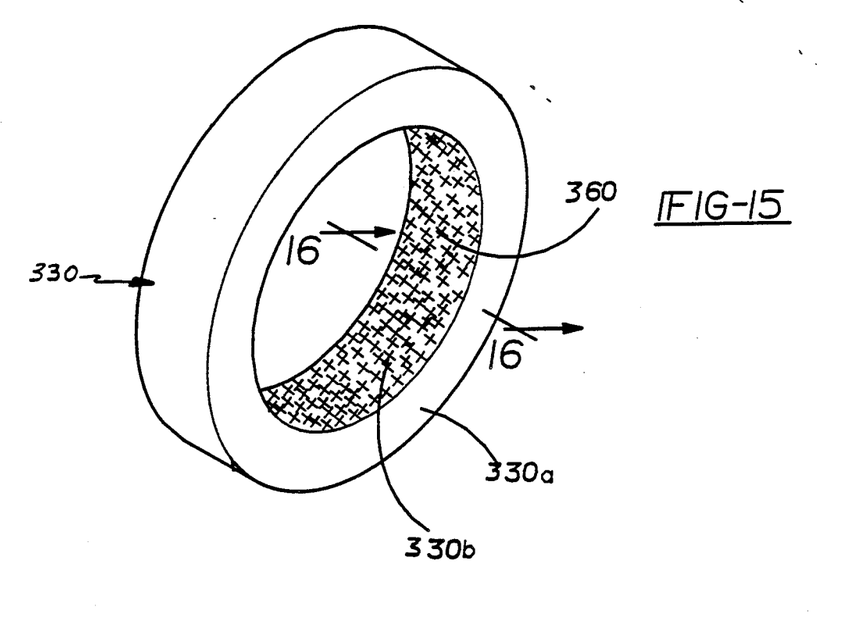
FIG. 15 is an perspective view of another embodiment of the invention comprising an annular braided sealing element.
Figure 16:
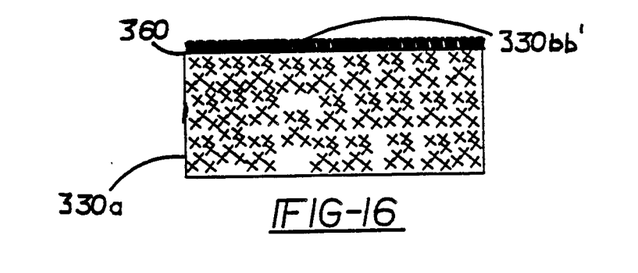
FIG. 16 is a sectional view of the sealing element of FIG. 15 with filaments on the inner sealing surface severed during use to enhance sealing action.

FIGS. 15-16 illustrate still another embodiment of the invention wherein the sealing element 330 is in the form of a continuous three-dimensionally braided annulus or ring. This sealing element 330 can be substituted for the sealing elements shown in FIGS. 1-14 to effect a desired sealing action of the clearance space S and/or SS between adjacent components (e.g., between rotor flange 20 and stator appendage 23 and between tips 14a of the blades 14 and the outer duct wall 19).

The sealing element 330 includes an integral sealing surface 330b that is formed of the braided filaments 360 defining the inner circumference of the annulus. The sealing element 330 is especially useful in static sealing applications (i.e., when the adjacent components do not move relative to each other). The outer portion 330a of the sealing element 330 is carried on one of the adjacent components and the inner sealing surface 330b engages the other component to provide a sealing action therebetween.

In dynamic sealing applications (i.e., where the components move or rotate relative to one another), the outer portion 330a of the sealing element 330 is carried on one of the components and the inner sealing surface 330b is engaged to the other component such that there is relative movement between the inner sealing surface 330b and the other of the components. Such engagement may cause wear of the inner sealing surface 330b and severing of some of the braided filaments 360 forming the inner sealing surface. For example, FIG. 16 illustrates severed ends 330bb' of such surface filaments. Such severed ends can increase the sealing action provided by the sealing element 330 as a result of the formation of numerous free flexible lengths of filaments on the inner sealing surface 330b that augment the sealing action and closure of the clearance space between the components. In addition, the sealing element 330 will exhibit the size/shape restorative capabilities and compliance/resiliency described hereinabove for the sealing element 30 of FIG. 2 by proper selection of the braid pattern and the types of filaments that are braided. As a result, the sealing element 330 can accommodate thermal and dynamic displacements of the adjacent components without loss of sealing function. The braided filamentary structure of the sealing element 330 can tolerate severing of the filaments on the inner sealing surface 330b without loss of structural integrity of the sealing element.

Although the invention has been illustrated hereinabove with respect to specific sealing applications in a fluid flow machine such as a gas turbine engine, those skilled in the art will appreciate that the invention has use in other myriad types of machines to seal a clearance space between adjacent components.

While the invention has been described in terms of specific embodiments thereof, it is not intended to be limited thereto but rather only to the extent set forth hereafter in the following claims.

I claim:

1. In a gas turbine engine having two components which are separated by a clearance space, a sealing element carried on one of the components and having a sealing portion in the clearance space in juxtaposition to the other of the components, said sealing portion comprising a plurality of three dimensionally braided filaments having a free length in a direction toward said other of the components for engaging said other of the components to effect a sealing action between the components.

2. The engine of claim 1 wherein the two components are relatively rotatable.

3. The engine of claim 1 including means for biasing the sealing element toward said other of the components.

4. The engine of claim 3 wherein the biasing means comprises spring means between the sealing element and said one of the components.

5. The engine of claim 3 wherein the biasing means comprises fluid pressure means for exerting fluid pressure on said sealing element toward said one of the components.

6. The engine of claim 5 wherein the braided filaments are braided at a selected density to control the level of bias.

7. The machine of claim 5 wherein a fluid metering plate is disposed between said sealing element and the fluid pressure to control the level of bias.

8. The engine of claim 1 wherein said sealing element includes a support member attached on a side thereof remote from said sealing portion.

9. The engine of claim 1 wherein said sealing element includes means for biasing said filaments at an angle generally in a direction of rotation of said other of the components.

10. The engine of claim 9 wherein the filament biasing means comprises a spring member disposed exteriorly adjacent said sealing portion.

11. The engine of claim 9 wherein the filament biasing means comprises a spring member disposed interiorly of said sealing portion.

12. The engine of claim 9 wherein said filament biasing means comprises stuffer filaments around which said braided filaments are braided, said stuffer filaments being oriented so as to bias said braided filaments in said direction.

13. The engine of claim 1 wherein the sealing portion is disposed between relatively moving components of a gas turbine engine.

14. The machine of claim 1 wherein said sealing element includes an internal cooling path.

15. The engine of claim 14 wherein said filaments are braided at a lesser density at one location of said sealing portion than another location to form said internal cooling path.

16. The engine of claim 14 wherein said filaments are braided in a manner to form an internal cooling passage in said sealing element.

17. The machine of claim 1 wherein the filaments are selected from at least one of metal filaments, non-metal filaments and mixtures of metal filaments and non-metal filaments.

18. In a gas turbine engine having first and second relatively rotatable components separated by an annular clearance space, an annular sealing element carried on the first component and having a sealing portion in the clearance space in juxtaposition to the second component, said portion comprising a plurality of three dimensionally braided flexible filaments having a free length oversized in a direction toward the second component to such an extent that said filaments engage and are compressed against said second component to effect a sealing action between the first and second components.

19. The sealing element of claim 18 wherein the annular sealing element comprises a plurality of arcuate segments abutted side-by-side at joints therebetween.

20. The sealing element of claim 19 including a back-up plate behind the abutting segments.

21. The sealing element of claim 19 wherein the joints are configured to circumferentially overlap.

22. In a machine having two relatively rotatable components which are separated by a clearance space, a sealing element carried on one of the components and having a sealing surface in juxtaposition to the other of the components, said sealing surface comprising a plurality of three-dimensionally braided filaments, said filaments being severed to form free filament lengths for engaging said other of the components to effect a sealing action between the components.

23. The machine of claim 22 wherein the sealing element comprises a three-dimensionally braided filamentary ring-shaped member.

24. The machine of claim 22 wherein the components are relatively movable such that said sealing surface is relatively movable with respect to said one and/or said other of the components.

25. The machine of claim 24 wherein said braided filaments forming said sealing surface are severed in use to form free filament lengths on said sealing surface to augment said sealing action.

26. In a machine having two relatively rotatable components which are separated by a clearance space, a sealing element carried on one of the components and having a sealing portion in the clearance space in juxtaposition to the other of the components, said sealing portion comprising a plurality of three dimensionally braided filaments having a free length in a direction toward said other of the components for engaging said other of the components to effect a sealing action between the components.

* * * * *